United States Patent
Lee et al.

[11] Patent Number: 5,108,730
[45] Date of Patent: Apr. 28, 1992

[54] LOW TEMPERATUE LIGHT OFF AMMONIA OXIDATION

[75] Inventors: Hyo C. Lee, Edison; Robert J. Farrauto; W. Robert Hatfield, both of Westfield, all of N.J.

[73] Assignee: Engelhard Corporation, Iselin, N.J.

[21] Appl. No.: 887,578

[22] Filed: Aug. 6, 1986

[51] Int. Cl.$^5$ ............................................ C01B 21/26
[52] U.S. Cl. .................................................. 423/403
[58] Field of Search ..................................... 423/403

[56] References Cited

U.S. PATENT DOCUMENTS

| | | | |
|---|---|---|---|
| 971,149 | 9/1910 | Schick | 502/175 |
| 1,321,376 | 11/1919 | Jones et al. | 422/222 |
| 2,185,607 | 1/1940 | Richardson | 423/403 |

FOREIGN PATENT DOCUMENTS

| | | |
|---|---|---|
| 1064893 | 10/1979 | Canada . |
| 2654913 | 6/1977 | Fed. Rep. of Germany ...... 423/403 |
| 2133216 | 11/1972 | France . |
| 2227048 | 11/1974 | France . |
| 2280430 | 2/1976 | France . |
| 2445173 | 7/1980 | France . |
| 998455 | 7/1965 | United Kingdom . |
| 1365601 | 9/1974 | United Kingdom . |
| 1444978 | 8/1976 | United Kingdom . |

Primary Examiner—John Doll
Assistant Examiner—Wayne A. Langel

[57] ABSTRACT

Method of low temperature start-up of ammonia oxidation plants by passing hydrogen and oxygen over platinum containing gauzes bearing a platinum coating having a surface area in excess of about 50 cm$^2$/g, thereby heating them to temperatures which are sufficient for catalytic oxidation of ammonia.

1 Claim, 7 Drawing Sheets

*FIG. 6*

SURFACE AREA VS. DECOMPOSITION TEMPERATURE

LOW TEMPERATUE LIGHT OFF AMMONIA OXIDATION

Start-up problems have long plagued manufacturers of nitric acid. In typical operations, catalytic oxidation of ammonia in heated air is initiated over platinum containing gauze using a hydrogen torch while operations are controlled manually based upon visual observation of the gauze. Not only is it possible to damage the catalyst gauze with the hydrogen torch but also unconverted ammonia is often nonselectively decomposed on the recovery gauze during start-up due to by passing of ammonia through the catalyst gauze resulting from wide variation in temperature between the hot portion of the gauze heated by the torch and remote cooler regions. Even worse, mixing of $NO_x$ and unconverted ammonia in the getter gauze can lead to unfavorable reactions which may damage some types of very high efficiency recovery gauzes particularly in plants operating at very high throughputs and pressures. Thus, at best, traditional methods of starting up plants using conventional catalyst gauzes have been tricky and time consuming while wasting significant amounts of ammonia, but, in some cases, also resulting in expensive damage to catalyst or recovery gauzes.

Methods of alleviating these problems have been sought widely. One purported solution (U.S. Pat. No. 4,435,373) involves pads made by agglomeration of randomly oriented platinum group metal fibers produced by melt extraction or melt spinning. It is said that these pads exhibit. . ."more rapid light-off, better conversion efficiency and increased life. . .". The alloys used in these pads are 90% Pt:10% Rh and 90% Pt:5% Rh:5% Pd alloys. In example 3 of this Patent, the surface area of melt spun 90% Pt:10%Rh fibers is said to be 8.3m$^2$/g, the surface area of melt spun 90% Pt:5% Rh:5% Pd fibers is said to be 13.3m$^2$/g as compared to conventional 90%Pt:10% Rh wire having a surface area of 6.9m$^2$/g. These figures are almost certainly intended to be in cm$^2$/g as 6.9 m$^2$/g is at least four orders of magnitude larger than the surface area of conventional platinum rhodium wire.

In British Patent 1,426,875, ammonia combustion is initiated over cobalt oxide containing catalysts by homogeneously combusting hydrogen upstream of the catalyst and passing the combustion products over the catalyst bed thereby mitigating the difficulties of localized deactivation and unsatisfactory propagation of reaction through the catalyst which are said to result from heating the catalyst locally with a hydrogen flame to initiate oxidation. A similar method is disclosed for plants using catalytic gauzes in U.S. Pat. No. 2,185,607.

In USSR Inventors Certificate 858905, exothermic heterogeneous catalytic oxidation of from 1% to 3.5% hydrogen in air on the surface of the catalyst gauzes is used to provide uniform heating of the gauzes prior to passage of ammonia and air mixture over the gauzes. The mixture of hydrogen and oxygen contacted with the gauzes is said to be at a temperature of 140° C.–250° C.

Handforth and Tilley, Catalysts for Oxidation of Ammonia to Oxides of Nitrogen, Industrial and Engineering Chemistry Volume 26 no. 12 pp. 1287–1292 reference reportedly unsuccessful efforts to use refractory base metal substrates clad with platinum group metal for ammonia oxidation which were said to fail as volatilization removed the active material and the underlying metal quickly poisoned the coating.

U.S. Pat. No. 1,321,376, Jones and Parsons suggests the use of "platinum gauze which has been "platinized" or coated with platinum black [i.e. platinum oxide] or platinum sponge by depositing upon it more platinum from solution".

It is an object of the present invention to provide a catalyst gauze which will light off quickly and easily at lower temperatures than the known gauzes or pads and, also, a method of initiating uniform ammonia oxidation over these gauzes starting from more accessible temperatures obtainable by compression of air so that preheaters and burners are not required.

SUMMARY OF THE INVENTION

Ammonia is oxidized easily at lower temperatures over platinum containing gauzes bearing a platinum coating having a surface area in excess of about 50 cm$^2$/g. These gauzes may be heated to a temperature which is sufficient to initiate ammonia oxidation by passing hydrogen in air over these gauzes at temperatures below 75° C., most preferably at temperatures of less than 50° C.

This application claims a method of low temperature start-up of ammonia oxidation plants by passing hydrogen and oxygen over high surface area gauzes thereby heating them to temperatures which are sufficient for catalytic oxidation of ammonia.

Copending application Ser. No. 888,179 filed of even date herewith claims a catalyst gauze bearing a high surface area coating of platinum thereupon as well as methods of using that gauze in oxidation of ammonia.

DETAILED DESCRIPTION OF PREFERRED EMBODIMENTS

The ammonia-air mixture in commercial nitric acid plants is commonly ignited using a hydrogen torch directed to a spot on the gauze which has been preheated with compressed hot air. After the spot begins to glow, ammonia is gradually added at an increasing flow rate until ignition is observed. Thereafter, heat conduction from the hot spot brings the remainder of the gauze up to the ignition temperature. Difficulties in properly manipulating the hydrogen torch are common especially for large gauzes. Too frequently, the torch burns a hole in either catalyst or recovery gauze while in other cases, initial ignition is slow or the spread of ignition is slow and uneven. We reduce these problems greatly by using catalyst gauzes with improved ignition characteristics which also protect the getter gauzes by reducing ammonia by pass during start-up. In addition, ignition stability is also significantly improved so that once ignition is obtained on a gauze, it can be sustained at even lower temperatures than the initial ignition temperature, in some cases even when the temperature of the inlet stream approaches ambient. This wide temperature range between ignition and extinction are important advantages for stable reactor operation during and following start-up. Further, these gauzes may be preheated by catalytic combustion of hydrogen occurring at relatively low temperatures usually obtainable in the plant flow stream.

Catalyst gauzes of the present invention are produced by forming an extremely catalytically active coating on conventional ammonia oxidation catalyst gauzes. Such gauzes typically consist of platinum group metal alloys primarily 90%Pt:10%Rh and 90%Pt:5%Rh:5%Pd and are typically woven meshes of about 0.003 of an inch diameter wires at about 80 wires per lineal inch. Other combinations of mesh and wire diameter may be used to advantage. For a detailed report, see Roberts and Gillespie, "Estimation of Platinum Catalyst Requirement for Ammonia Oxidation" 45 Advances in Chemistry Series No. 133, Chemical Reaction Engineering II page 600–611. See also U.S. Pat. No. 3,660,024.

The catalytic coating may be applied by a variety of methods producing extremely high surface area coatings of substantially pure platinum onto the above mentioned alloys providing decreased light off temperature upon a strong thermally stable base.

Preferred high surface area coatings may typically be formed by decomposing platinum metal precursors on the catalyst gauze after it has been woven and cut to shape. For ease of manufacturing, the preferred platinum metal precursors are aqueous admixtures bearing thermally decomposable platinum metal compounds although other solvents including hydrocarbons, particularly butanol, may also be used to easily provide high uniformity coatings. The preferred method of applying these coatings to the gauze is by spraying, with electrostatic spraying being greatly preferred. The precursor admixture may also be applied by dipping the gauze in the admixture, precipitation methods such as electroless deposition, electroplating, electrodeposition, or brushing or painting the admixture on, much as paint is applied with a brush. More esoteric methods such as chemical vapor deposition, sputtering and other forms of physical vapor deposition may also be used.

Figure 1:
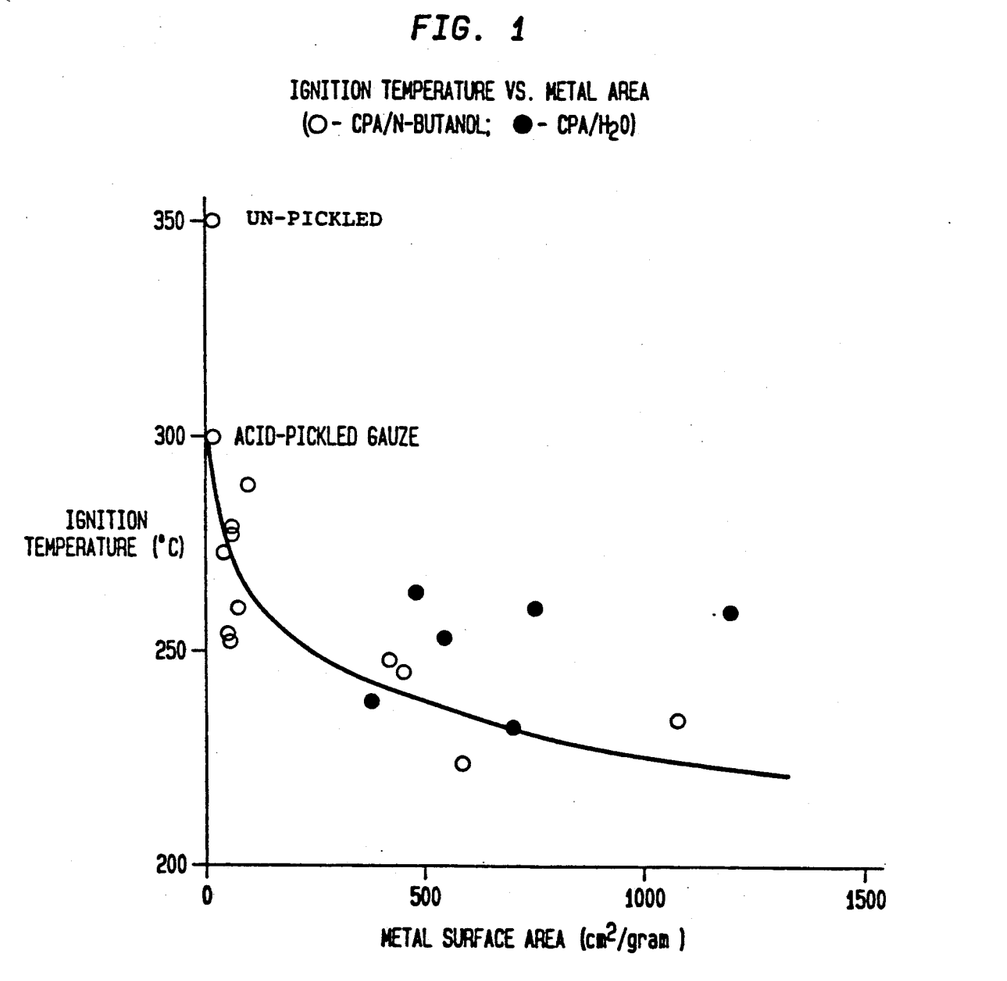
FIG. 1 illustrates the decline in light off temperature observed with gauzes having increased surface area at constant flow rate.
Figure 2:
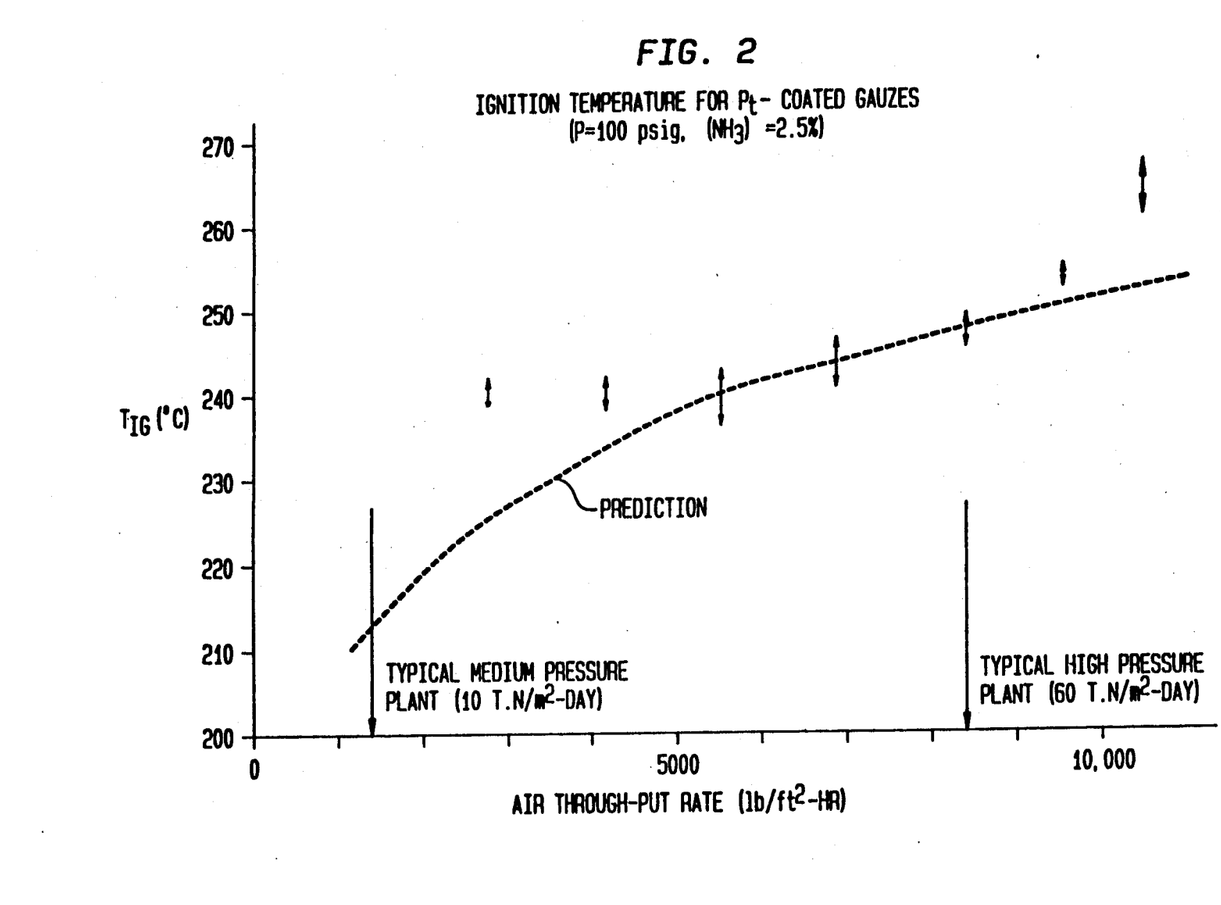
FIG. 2 illustrates predicted and observed variations in ignition temperature with flow rate for coated gauzes of the present invention.

As shown in FIG. 1, ignition temperature correlates well with surface area of platinum coated gauzes prepared from solutions of chloroplatinic acid in either normal-butanol or water with the ignition temperatures of the water based coatings being higher however than those of the butanol based coatings, probably due to difficulty of obtaining a uniform coating with aqueous based systems, this difficulty being manageable by proper use of surfactants, such as Igelpal CO-630, Colloids 211 and 209 which do not poison platinum. The preferred platinum coated gauzes of the present invention are characterized by a surface area preferably in excess of about 50 $cm^2/g$, and more preferably in excess of about 250 $cm^2/g$ and most preferably in excess of about 350 $cm^2/g$. The platinum loading is preferably at least about 0.5 grams of platinum metal per square meter of bulk gauze area coated essentially uniformly onto the gauze. By bulk gauze area, we mean not the actual or total surface area of the aggregate of the wires in the gauze considered for example as cylinders but rather the area of the gauze considered as a sheet of material. For example, a one meter by one meter sheet of any gauze would be said to have a bulk gauze area of one square meter. More preferably the platinum loading is at least about 3.0g/$m^2$ and more preferably at least about 4.0g/$m^2$ or about 1% of the weight of the gauze. Preferred gauzes of the present invention exhibit ignition temperatures of less than about 275° C., preferably less than about 260° C. and most preferably less than about 250° C. in a plant operating at a mass throughput of about 8500 lbs/$ft^2$-hr. As the ignition temperature over catalytic gauzes depends strongly on the flow rate over the gauze, to facilitate comparisons, throughout this application, all ignition temperatures are as measured at this standard flow rate of 8500 lbs/$ft^2$-hr unless otherwise specified. FIG. 2 illustrates the expected variation in ignition temperature expected with variations in the flow rate as well as the variation actually observed in a laboratory unit.

To protect the getter gauzes, it is extremely advantageous that the light off temperature of the catalyst gauze be no more than the ignition temperature of ammonia on the recovery gauze. Typically ammonia will ignite on high palladium content gauzes at temperatures of around 260° C. at the standard flow rate of 8500 lbs/$ft^2$ - hr.

Figure 3:
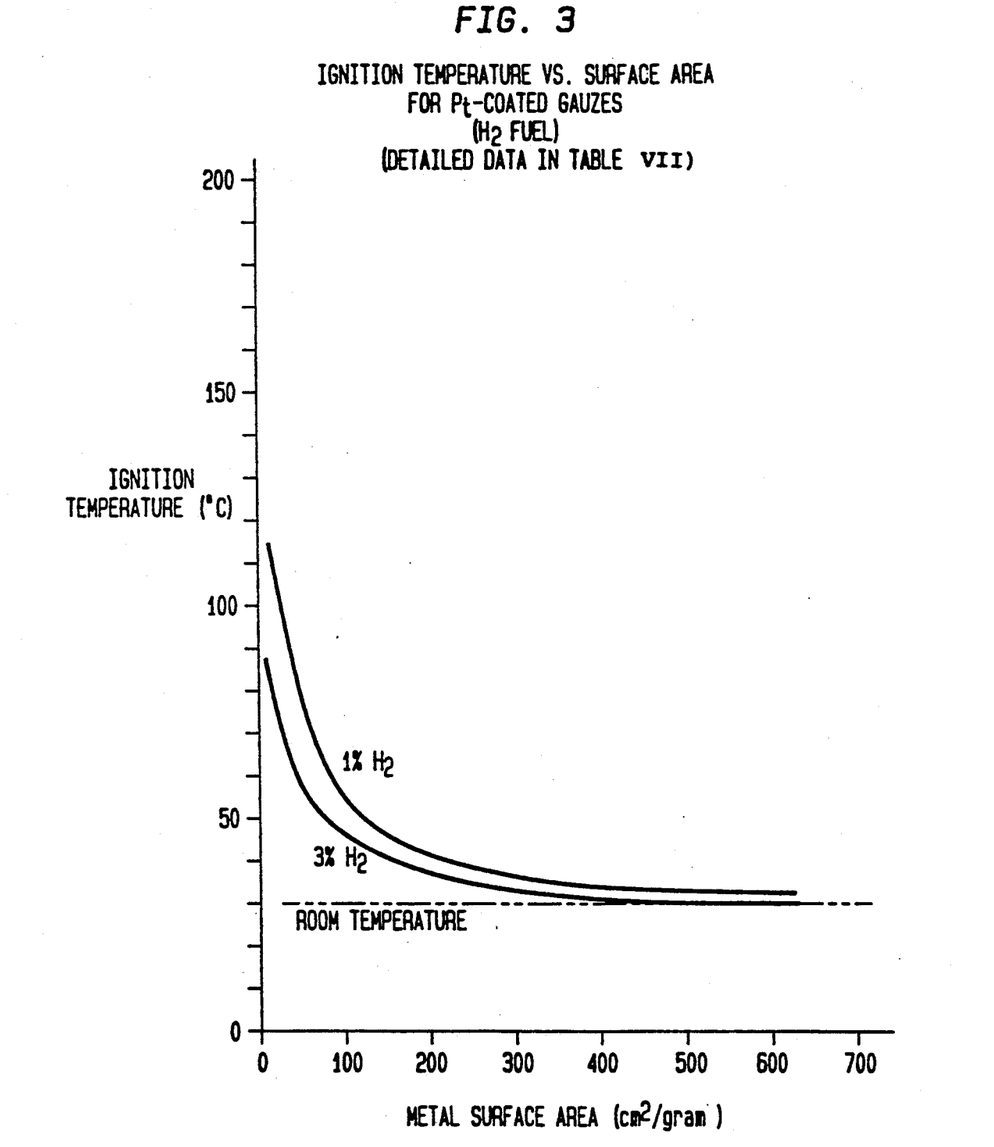
FIG. 3 illustrates the ignition temperature of hydrogen observed over gauzes of the present invention.

Gauzes of the present invention are not only easily ignited with a hydrogen torch but may also be ignited by low temperature catalytic combustion of hydrogen on the surface of the gauzes thus obviating the uniformity problems inherent in hydrogen torch ignition. While oxidation could be initiated over previous known gauzes using a flow of hydrogen through the reactor, preheaters and burners were required to bring the gauzes up to the hydrogen ignition temperature of about 80° C. to 125° C. Since the ignition temperature of hydrogen over gauzes of the present invention having surface areas of about 500$cm^2/g$ is at about room temperature, hydrogen can be ignited over these gauzes using the preheat supplied by the compressor, then the amount of hydrogen increased to in the range of from about 3% to about 5% thereby heating the gauze to the ammonia ignition temperature of about 250° C. to 300° C. FIG. 3 illustrates the ignition temperature of hydrogen on platinum coated gauze as a function of the surface area of the gauze. Thus it can be seen that even gauzes with lower surface areas can ignite hydrogen at the temperatures typically encountered in pressurized air from the compressor.

Figure 4:
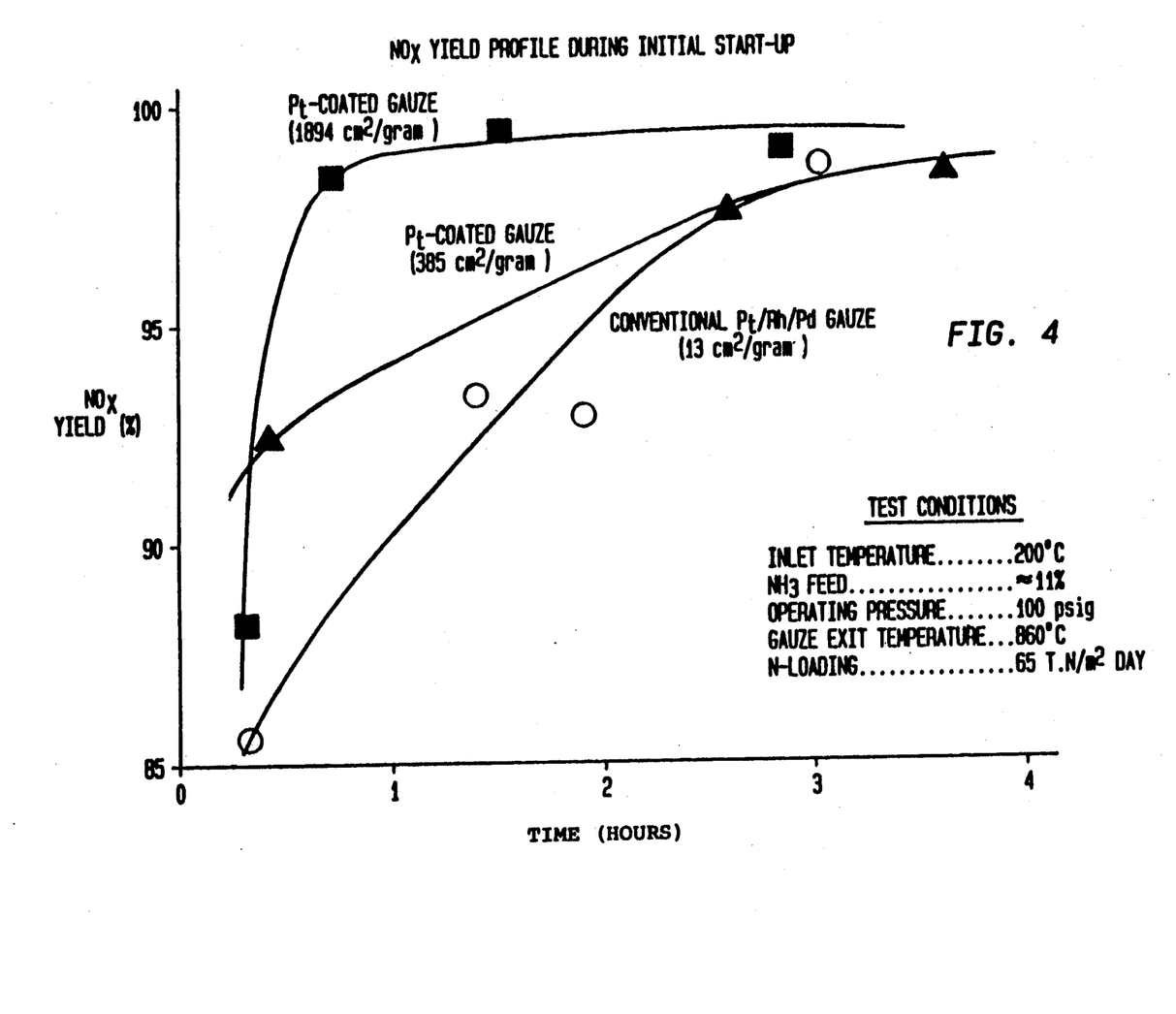
FIG. 4 illustrates the improved selectivity and conversion efficiency observed with gauzes of the present invention during the first days following start-up.
Figure 5:
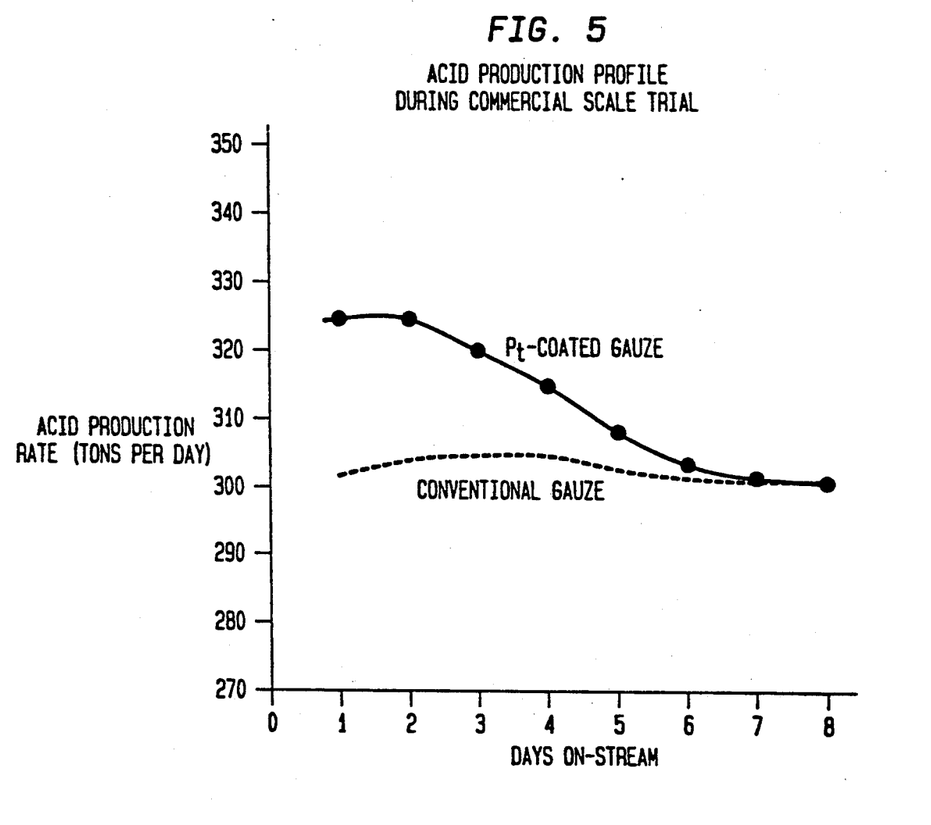
FIG. 5 illustrates the increased production rate of nitric acid experienced with gauzes of the present invention during the first few days following start-up.

Gauzes of the present invention not only light off easily but they also provide another unexpected benefit as illustrated in FIGS. 4 and 5 in that the $NO_x$ yield during the first few days of operation seems to be markedly higher than with prior art gauzes. While this advantage subsides after a few days, over the entire cycle, it can amount to about one quarter of a percent or more increase in yield. Unfortunately these coatings do not retain their high surface area during prolonged use so that the increased yield does not persist throughout the cycle.

The most preferred method of forming the coated gauzes of the present invention is by electrostatic spraying in which droplets of the coating precursor admixture are provided with an electrostatic charge as they pass through a high resistance (around 10 mega ohm) electrode at high voltage comprising an array of fine wires near the fluid nozzle of the spray apparatus and thus can be gathered on grounded gauze targets with high efficiency, even depositing on the side of the wires away from the spray gun.

The following examples are provided to illustrate various embodiments of the invention in a concrete fashion.

EXAMPLE I

This example illustrates formation of high surface area coatings using platinum precursors carried in n-butanol. Catalyst gauzes of 90% Pt:10% Rh with 80 wires per inch and 0.0031 inch diameter were cleaned in an ultrasonic bath and washed with deionized water, then dried in air Two coats of high surface area platinum precursor were applied to both sides of the gauze by spraying chloroplatinic acid in n-butanol with a platinum content of 5% by weight onto the cleaned gauze then removing the n-butanol by passing hot air at around 120° C. over the gauze. After both coats of precursor were applied, the gauze was slowly heated to, then held for 30 minutes at, 450° C. thereby decomposing the precursor to yield a high surface area platinum coating.

Similarly other gauzes were coated by applying other platinum precursors in n-butanol as set forth in Table I which also reports the surface areas obtained which are from about 5 to about 120 times greater than that of conventional gauzes.

The measured surface areas, as obtained by cyclic voltammetry are set forth in Table I.

Figure 7:
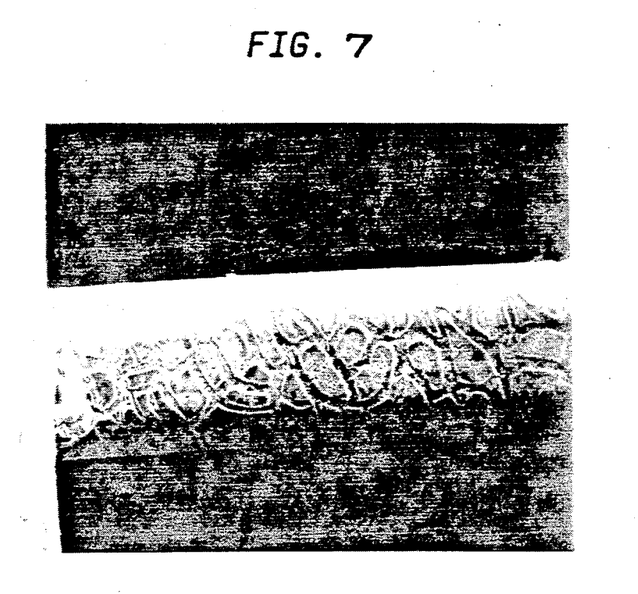
FIG. 7 is a photomicrograph of a high surface area platinum coating of a gauze of the present invention.

FIG. 7 is a photomicrogaph illustrating the high uniformity of the Pt coating demonstrating how use of N-butanol as a solvent allows uniform coatings presumably by virtue of its excellent atomizing and wetting characteristics.

TABLE I

| | Pt-coated Gauzes Prepared from Pt Salts in N-butanol | | | | |
|---|---|---|---|---|---|
| Sample No. | Pt Salt | Coating Method | Pt-Loading (g/m$^2$) | Surface Area (cm$^2$/g) | Remarks |
| 1 | Pt Resinate* | Dipping | 0.71 | 63 | |
| 2 | Pt Resinate* | Dipping | 2.27 | 151 | HCl Washed |
| 3 | CPA | Dipping | 1.87 | 525 | |
| 4 | CPA | Dipping | 3.26 | 225 | Double Coating |
| 5 | CPA | Air Brush | 3.84 | 573 | |
| 6 | CPA | Air Brush | 3.44 | 385 | With 0.2% Ethylene Glycol |
| 7** | CPA | Air Brush | 0.29 | 98 | With 0.2% Ethylene Glycol |
| 8 | CPA | Air Brush | 2.53 | 65 | With 0.2% Ethylene Glycol |
| 9 | CPA | Air Brush | 6.65 | 1064 | With 0.2% Ethylene Glycol |
| 10 | Pt Resinate* | Air Spray | 2.17 | 58 | |
| 11 | CPA | Air Spray | 3.77 | 256 | |
| 12 | CPA | Air Spray | 5.31 | 170 | |
| 13 | CPA | Air Spray | 4.22 | 1065 | |
| 14 | CPA | Air Spray | 5.73 | 1549 | |

CPA = chloroplatinic acid
Pt resinate = commercially available platinum salts of a mixture of resin acids.
**precursor applied to only one side of gauze

EXAMPLE II

This example illustrates formation of high surface area coatings using platinum precursors carried in aqueous admixtures.

Catalyst gauzes of 90% Pt:5% Rh:5% Pd with 80 wires per inch and 0.0031 inch diameter were cleaned in an ultrasonic bath and washed with deionized water. After drying in air, the aqueous chloroplatinic acid admixture with 5% Pt by weight was sprayed onto the cleaned Pt/Rh/Pd gauze. After the carrier was removed, another coating of precursor was applied, and the salt converted to platinum as described in Example I. Similarly, admixtures of chloroplatinic acid in water were applied to other gauzes as set forth in Table II which also reports the surface areas of the resulting gauzes.

TABLE II

| | Pt-coated Gauzes prepared from Aqueous CPA Solution | | | | |
|---|---|---|---|---|---|
| Sample No. | Pt Salt | Coating Method | Pt-Loading (g/m$^2$) | Surface Area (cm$^2$/g) | Remarks |
| 1 | CPA | Dipping | 0.47 | 63 | soaked overnight |
| 2 | CPA | Air Spray | 2.15 | 365 | |
| 3 | CPA | Air Spray | 4.64 | 400 | |
| 4 | CPA | Air Spray | 1.04 | 763 | |
| 5 | CPA | Electrostatic Deposition | 1.58 | 1228 | 2.5 A/ft$^2$ for 30 min. |
| 6 | CPA | Electrostatic Spray | 1.21 | 495 | one coat on one side |
| 7 | CPA | Electrostatic Spray | 5.34 | 514 | two coats on one side |

Figure 8:
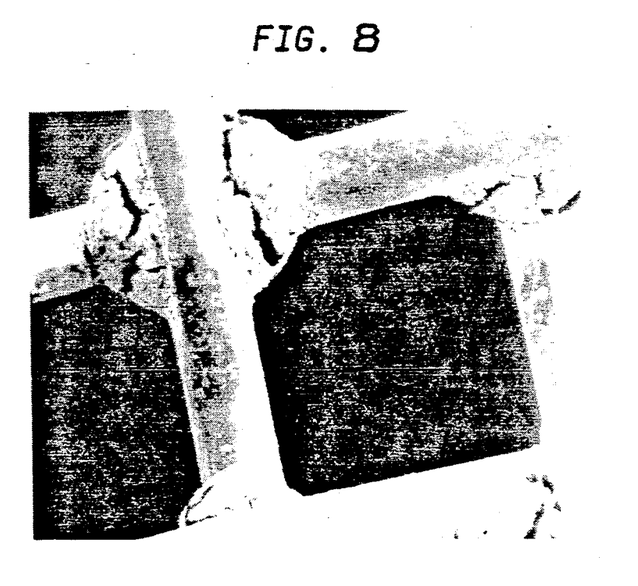
FIG. 8 is a photomicrograph of a non-uniform coating prepared for an aqueous chloroplatinic acid solution.

FIG. 8 is a photomicrograph illustrating a typical coating obtained by this method. The tendency of these coatings to agglomerate or thicken near wire intersections should be noted.

EXAMPLE III

As set forth in Table III catalyst gauzes of 90%Pt:5%Rh:5%Pd were coated with high surface area platinum using the procedures of Example II surfactants such as Igelpal CO-630, Colloid 211, etc., were added to the aqueous admixture to improve wetting characteristics of the Pt salt solution and thereby to increase the uniformity of the applied coatings while minimizing bridging problems in wire meshes.

Table III also sets forth the surface areas obtained along with a qualitative judgment of coating uniformity for each surfactant.

TABLE III

Effect of Surfactant

| Sample No. | Pt Salt | Surfactant | Coating Method | Pt Loading (g/m²) | Surface Area (cm²/g) | Remarks |
|---|---|---|---|---|---|---|
| 1 | CPA/H₂O | Igelpal CO-630* (0.5% by wt.) | Air Spray | 5.89 | 706 | |
| 2 | CPA/H₂O | Colloid 211** (0.5% by wt.) | Air Spray | 4.36 | 353 | |
| 3 | CPA/H₂O | Colloid 211** (0.5% by wt.) | Air Spray | 4.54 | 672 | Uniform Coating |

*Tradename of GAF
**Tradename of North Chemical Co., Inc.

Catalytic performance of catalyst gauze pack samples was evaluated as follows using the laboratory ammonia oxidation reactor described in U.S. Pat. No. 4,497,657 which had been modified to allow for placement of a thermocouple in the catalyst gauze pack.

EXAMPLE IV

Ignition tests were conducted with five-ply packs of gauze samples at 100 psig reactor pressure and 9000 lbs/ft²-hr throughput. A thermocouple was embedded between the second and third layers of the gauze pack to determine light-off temperature.

To measure ignition temperature of gauzes from Examples I through III, air at a fixed temperature was passed through a catalyst gauze pack and intermittently ammonia was injected to give a concentration of 2.5% ammonia in air through the pack while ammonia was being fed. If a sharp temperature rise was detected by the thermocouple, it was concluded that the fixed temperature of the air was at or above the ignition temperature of ammonia in air over the particular gauze pack in use. If no exotherm is detected the ammonia concentration was increased to 5% to determine whether ignition could be obtained at this higher temperature. If not the temperature of the air stream was increased and this procedure repeated until ignition was detected. Ignition is usually accomplished by speeding up the oxidation reaction by addition of an ammonia feed and the reaction itself releases heat at the gauze surface faster than heat is transferred to the bulk gas stream.

Thus the ignition temperature was measured as the lowest temperature at which the ammonia/air mixture spontaneously started to be combusted.

Table IV reports the light-off temperature obtained with each sample while FIG. 1 presents these results in graphic form.

TABLE IV

Ignition Temperature of Pt-Coated Gauzes at 8500 lb/ft²-hr and 100 psig

| Sample No. | Surface Area (cm²/g) | Ignition Temp. (°C.) 2.5% NH₃ | Ignition Temp. (°C.) 5% NH₃ |
|---|---|---|---|
| Example I | | | |
| I-1 | 63 | 261 | 258 |
| 2 | 151 | 254 | — |
| 3 | 525 | 255 | 250 |
| 4 | 225 | 247 | 245 |
| 5 | 573 | 224 | 218 |
| 6 | 385 | 248 | 243 |
| 7 | 98 | 288 | 285 |
| 8 | 65 | 266 | 258 |
| 9 | 1064 | 233 | 225 |
| 10 | 58 | 249 | — |
| 11 | 256 | 249 | 241 |
| 12 | 170 | 245 | — |
| 13 | 1065 | 232 | — |
| Example II | | | |
| II-1 | 63 | 276 | — |
| 2 | 365 | 250 | — |
| 3 | 400 | 263 | — |
| 4 | 763 | 257 | — |
| 5 | 1228 | 253 | — |
| 6 | 495 | 250 | — |
| 7 | 514 | 260 | — |
| Example III | | | |
| III-1 | 706 | 242 | — |
| 2 | 353 | 236 | — |
| 3 | 672 | 232 | — |

EXAMPLE V

A gauze pack consisting of five layers of Pt-coated gauze with an average surface area of 385 cm²/g, which were prepared as in Example I, followed by a five-ply pad of conventional 90%Pt:5%Rh:5%Pd gauze was tested to measure the $NO_x$ yield profile during start-up.

Prior to beginning a run, the light-off temperature was measured to be 248° C. with 2.5% ammonia feed as illustrated in Example IV. After ignition, a gaseous stream of air containing about 11% ammonia by volume under a pressure of 100 psig was introduced to the laboratory reactor, described in U.S. Pat. No. 4,497,657, at a nitrogen loading of about 65 tons nitrogen (calculated as ammonia) per square meter of the bulk cross-sectional area of the experimental gauze per day (i.e., 65T(N)/m²/ day). The gauze exit temperature was maintained at a relatively constant 860° C. while the air preheat temperature was around 200° C.

As summarized in Table V, $NO_x$ yield as a function of time was determined with both the experimental gauze packs as well as a typical pack consisting of 10 layers of conventional 90%Pt:5%Rh:5%Pd gauze.

A $NO_x$ yield of 92% was obtained with the Pt-coated gauze pack 20 minutes after start-up and a peak $NO_x$ yield of 97% was achieved after about 2.5 hours on-stream. In addition, it was observed that a similar Pt-coated gauze pack with a surface area of 1894 cm²/g reached a peak efficiency of 98% 45 minutes after start-up, while the conventional gauze pack required about 4 hours to reach this level, as illustrated in FIG. 4.

TABLE V

NOₓ Yield Profiles

| Time (hr) | NH₃, % | NOx Yield % |
|---|---|---|
| Run 1 Pt:5% Rh:5% Pd Catalyst (10 Sheets) | | |
| 0.3 | 10.89 | 85.6 |
| 1.4 | 11.35 | 93.0 |
| 1.9 | 10.89 | 92.6 |
| 3.0 | 10.89 | 98.1 |
| Pt Coated Gauze | | |
| Run 2 | | |
| Top 5 layers: Pt-coated Gauze (Surface Area = 385 cm²/g) | | |
| Bottom 5 layers: Conventional Gauze (90% Pt/5% Rh/5% Pd) | | |
| 0.4 | 10.89 | 92.0 |
| 2.6 | 10.89 | 97.1 |
| 3.6 | 10.89 | 97.7 |
| Run 3 | | |
| Top 5 layers: Pt-Coated Gauze (Surface Area 1894 cm²/g) | | |

TABLE V-continued

| Time (hr) | NOx Yield Profiles | |
|---|---|---|
| | NH3, % | NOx Yield % |
| Bottom 5 layers: Conventional Gauze (90% Pt/5% Rh/5% Pd) | | |
| 0.3 | 11.80 | 87.9 |
| 0.6 | 11.80 | 97.8 |
| 1.5 | 11.80 | 98.9 |
| 2.8 | 11.80 | 98.5 |

EXAMPLE VI

A commercial scale catalyst gauze pack was prepared by air-assisted spraying of 5% chloroplatinic acid/n-butanol solution as set forth in Example I.

This gauze pack consisting of the top five layers of Pt-coated gauze followed by seventeen layers of conventional 90%Pt: 5%Rh: 5%Pd was evaluated in a commercial plant operating at:

| | |
|---|---|
| Operating Pressure | 125 psig |
| Air Preheat Temp. | 270° C. |
| Ammonia Feed | 10.1% |
| Gauze Exit Temp. | 950° C. |
| N-Loading | 70 T(N)/$m^2$ day |
| Gauze Cycle | 70 90 Days |

Upon start-up, it was observed that the hydrogen torch could be removed after only about 20 seconds while normally the torch is applied for about 2 minutes. It was further observed qualitatively that the ignition spread rapidly over the surface. Measured $NO_x$ production is presented in Table VI for the first five days of operation.

FIG. 5 illustrates the improvement in overall $NO_x$ production graphically.

TABLE VI

| | Commercial Trial Results of Pt-Coated Gauze | |
|---|---|---|
| | Acid Production Rate (TPD) | |
| On-Stream Time (Days) | Typical Conventional Gauze | Experimental Pt-Coated Gauze |
| 1 | 300 | 325 |
| 2 | 302 | 324 |
| 3 | 303 | 319 |
| 4 | 304 | 314 |
| 5 | 303 | 308 |
| 6 | 303 | 303 |
| 7 | 300 | 303 |
| 8 | 302 | 302 |
| 9 | 303 | 303 |
| 10 | 301 | 301 |

EXAMPLE VII

Catalyst gauzes prepared as set forth in Examples I were placed in the laboratory ammonia oxidation reactor described above then 1% hydrogen in air passed through the gauzes of a flow rate of 8500 lb/ft$^2$-hr with the temperature being steadily increased until ignition was observed. This procedure was repeated using 3% hydrogen. Table VII sets forth the ignition temperature for each of these gauzes.

TABLE VII

| | Ignition Test with Hydrogen | | | |
|---|---|---|---|---|
| Sample NO. | Pt-Loading (g/$m^2$) | Surface Area* (cm$^2$/g) | Ignition Temp. (°C.)** | |
| | | | 1% H$_2$ | 3% H$_2$ |
| I. Standard Gauze | | | | |
| 1 | 0 | 13 | 126 | 91 |
| 2*** | 0 | 13 | 103 | 79 |
| ***(Acid-Washed) | | | | |
| II. Pt-Coated Gauzes | | | | |
| 3 | 6.26 | 62 | 71 | 66 |
| 4 | 5.60 | 93 | 52 | 43 |
| 5 | 4.50 | 497 | 25 | less than 23 (Room Temp) |

*By Cyclic Voltammetry
**At 9000 lbs/ft$^2$-Hr. and 100 psig

FIG. 3 illustrates the very low hydrogen ignition temperatures obtained with gauzes of this invention.

EXAMPLE VIII

Catalyst gauzes prepared as in Example I were tested for ignition at varying gas throughputs as set forth in Table VIII which also presents ignition data for an ammonia feed concentration of 2.5% at 100 psig reactor pressure. Ignition temperature was reduced by 25° C. as mass throughput decreased from 10,320 to 2750 lb/ft$^2$-hr. Further decreases in the ignition temperature are expected for low/medium pressure plant conditions as illustrated in FIG. 2.

TABLE VIII

| Effect of Throughput | |
|---|---|
| Throughput Rate (lb/ft$^2$-hr) | Ignition Temperature (°C.) |
| 2,750 | 240 ± 2 |
| 4,130 | 240 ± 2 |
| 5,500 | 240 ± 3 |
| 6,880 | 244 ± 4 |
| 8,400 | 247 ± 2 |
| 9,630 | 254 ± 1 |
| 10,320 | 264 ± 3 |

EXAMPLE IX

A series of platinum coated catalyst gauzes were prepared as described in Example I except that the platinum precursor decomposition temperature was varied between 400° C. and 600° C.

Table IX sets forth the results of characterization of these samples including platinum loading surface area and the percentage of platinum not fully converted to the metal from the precursor.

TABLE IX

| Effect of Decomposition Temperature | | | |
|---|---|---|---|
| Decomposition Temp. (°C.) | Pt Loading (g/$m^2$) | Surface Area (cm$^2$/g) | Non-Metallic Pt Total Pt Coating (%) |
| 400 | 7.5 | 2794–3383 | 23 |
| 450 | 6.3 | 696–2136 | less than 1 |
| 500 | 5.6 | 567–586 | 0 |
| 550 | 5.5 | 267–366 | 0 |
| 600 | 5.5 | 183–240 | 0 |

Figure 6:
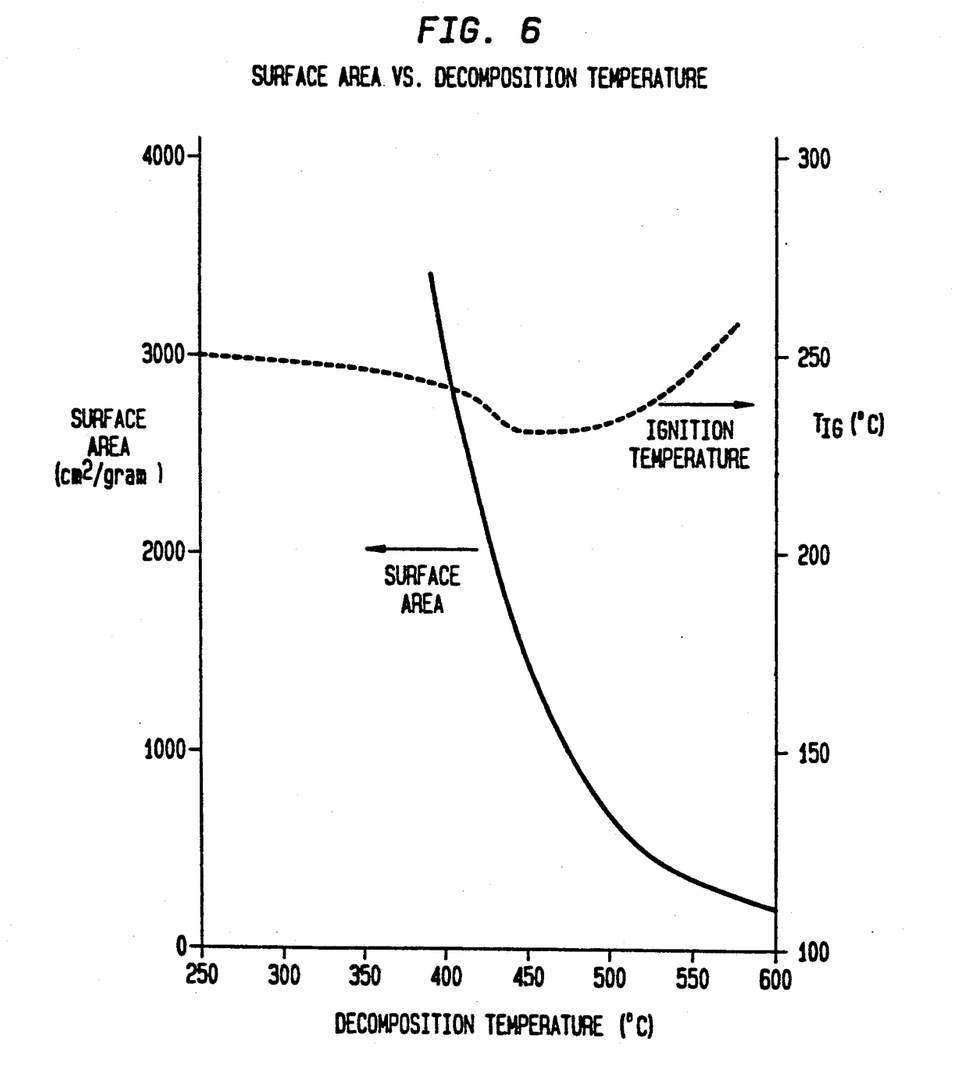
FIG. 6 illustrates the variation in surface area of coated gauzes with the temperature at which the coating precursor is decomposed and also illustrates the effect of decomposition temperature on ignition temperature.

Significant weight reductions occurred during precursor decomposition below 450° C., while increasingly severe sintering of the high surface Pt coatings was apparent for gauze samples wherein the precursor was decomposed above 450° C. The lowest light-off temperature was observed with Pt-coated gauzes decomposed at around 450° C., as illustrated in FIG. 6.

EXAMPLE X

To demonstrate the feasibility of start-up from room temperature using a stream of hydrogen in air instead of a hydrogen torch, catalyst gauzes prepared as set forth in Examples I were tested in the laboratory reactor mentioned above by passing 1% hydrogen in air over the gauze which was initially at 23° C. until an exotherm was observed, the concentration of hydrogen in the feed was then increased slowly until an exit temperature of 325° C. was observed whereupon ammonia initially at a concentration of 5% was passed over the gauzes until a further exotherm was observed whereupon the flow of hydrogen was discontinued and the flow of ammonia increased to about 11% to verify that satisfactory ignition had been obtained.

EXAMPLE XI

After measuring the ignition temperature with 5% ammonia feed as described in Example IV, the air preheat temperature was gradually reduced until the ignition was extinguished. As the inlet temperature decreased, the gauze surface temperature started to cool down and eventually ignition could not be sustained. Accordingly, a minimum air preheat temperature to sustain ignition was measured as the extinction temperature.

Table X sets forth the test results of the ignition and extinction temperatures for multiple steady states on the conventional and Pt-coated gauzes at 8500 lb/ft²-hr throughput and 100 psig reactor pressure.

TABLE X

Hysteresis of Ammonia Oxidation Gauzes

| Sample No. | Surface Area ($cm^2/g$) | Ignition Temp (°C.) | Extinction Temp (°C.) |
|---|---|---|---|
| Conventional Gauze X-1 | 13 | 334 | 222 |
| Pt-coated Gauze X-2 | 364 | 252 | 66 |

As our invention, we claim:

1. An improved process for initiating oxidation of ammonia in a plant of the type in which a mixture of ammonia in air is passed over a platinum containing catalyst and oxidized thereupon wherein the improvement comprises providing an improved catalyst gauze having a high surface area coating of platinum disposed thereupon, said improved catalyst gauze being capable of oxidizing hydrogen at a temperature of less than 75° C. at a throughput rate of 8500 lb/ft²-hr, the surface area of the gauze being in excess of about 50 $cm^2/g$, and heating the improved catalyst gauze from said temperature below 75° C. by passing a mixture of hydrogen in air thereover, initiating reaction between said hydrogen and air at the surface of said catalyst gauze, and thereafter increasing the concentration of hydrogen in said mixture and thereby raising the temperature of said catalyst gauze to the temperature at which it is capable of oxidizing ammonia in air.

* * * * *